UNITED STATES PATENT OFFICE.

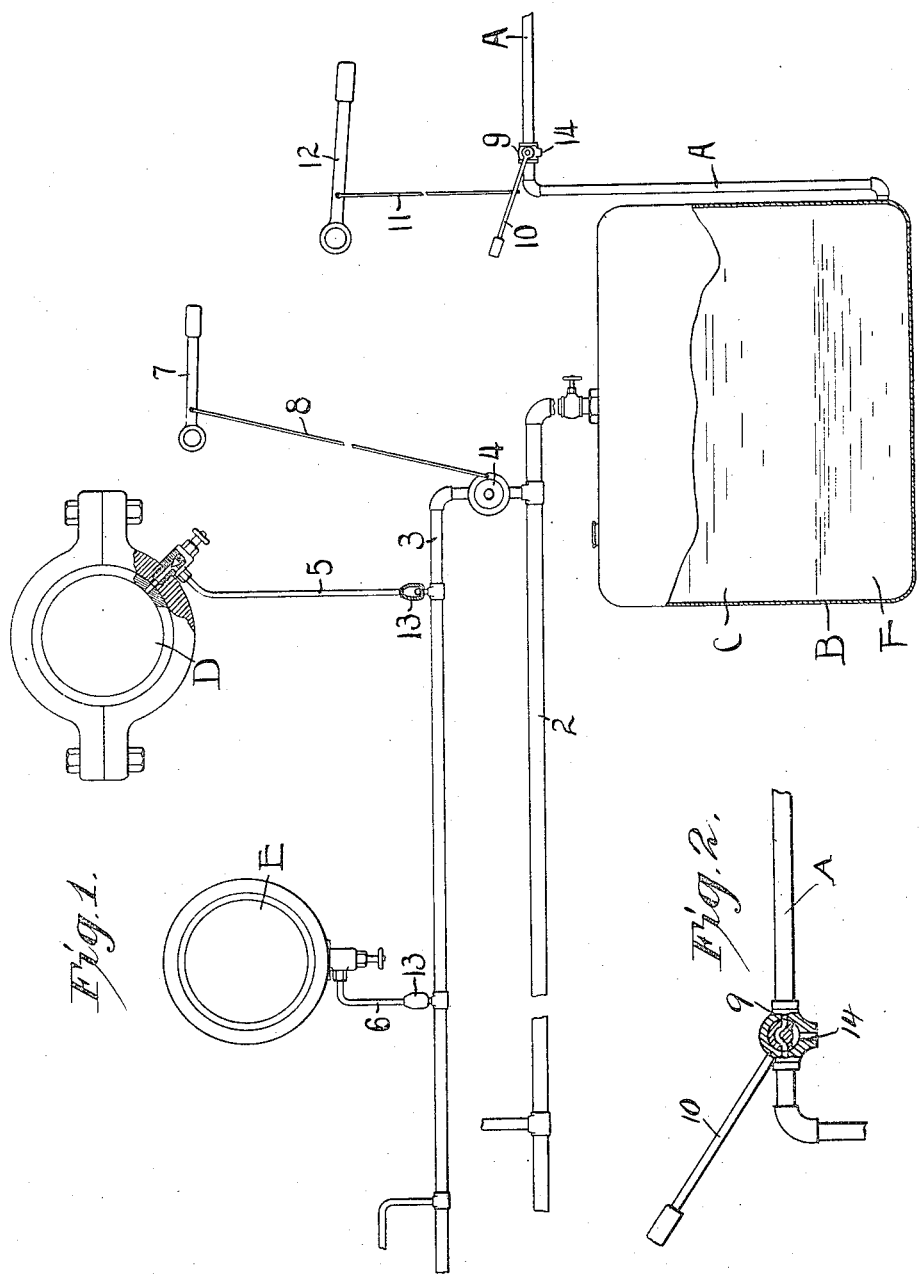

FRITZ KOCH, OF ST. PAUL, MINNESOTA.

LUBRICATING SYSTEM.

1,209,851. Specification of Letters Patent. Patented Dec. 26, 1916.

Application filed May 25, 1914. Serial No. 840,914.

*To all whom it may concern:*

Be it known that I, FRITZ KOCH, a citizen of the United States, residing at St. Paul, in the county of Ramsey and State of Minnesota, have invented certain new and useful Improvements in Lubricating Systems, of which the following is a specification.

My invention relates to improvements in lubricating systems for manufacturing plants, its objects being to provide improved means for causing a flow of oil or other liquid lubricant under a central pressure system to all or a selected portion of the machine bearings in the plant and a stoppage of the flow the moment the pressure is taken off.

Further objects are to supply the oil in such way that there shall be no waste or leakage of oil when the supply is shut off, and to provide means whereby the flow of oil is automatically started or stopped as the case may be, when the source of power or prime mover is applied to, or disconnected from, the machinery.

To these ends the invention consists in the construction, combination, and arrangement of parts hereinafter described and claimed.

In the accompanying drawings showing an embodiment of the invention, Figure 1 is a diagrammatic view of the improved lubricating system, with some parts broken away, and Fig. 2 is a sectional view of the three-way valve in the water supply pipe.

In carrying out the invention I have utilized the general water supply of the plant as the central source of pressure.

In the drawings A represents a water supply pipe leading into the bottom of a tank B which is partially filled with the oil or other liquid lubricant C. Leading from the top of the reservoir is a main oil supply pipe 2 which, either directly or through other branch pipes, conducts the oil to the machinery bearings to be lubricated. In the drawings two machine bearings D and E are shown by way of illustration, but it will be understood that the pipes can be led to all or any number of the bearings in the plant. The oil is led to the bearings D and E by means of a main branch pipe 3 in which is a cut-off valve 4, and subsidiary branch pipes 5 and 6, respectively, which lead off from the branch pipe 3. The valve 4 is operated by means of a lever 7 operatively connected with the valve 4 by means of a connection 8, whereby the oil can be cut off entirely from all the bearings supplied by the branch pipe 3.

In the main water pipe A is a three-way valve 9 whereby the water F is supplied to the lower part of the tank B. This valve is provided with a lever 10 having operative connection 11 with the lever 12 which operatively connects the source of power or prime mover (not shown) with the machinery to be operated, so that the valve 9 will be operated when the lever 12 is thrown to turn on the power and closed when the lever is thrown to cut off the power. Thus the same mechanism is employed for turning on the supply of water that is used for supplying the power to the machinery.

In a large plant the bearings are at various levels, some being higher and some lower than others. If, therefore, the supply of oil should be stopped, whether by cutting off the supply by means of the valve 4, or by shutting off the forward pressure by closing the valve 9, the downward pressure of oil in the branch pipes leading to the upper bearings will be greater than the downward pressure in the branch pipes leading to the lower bearings, so that if precautions were not taken, the oil in the branch pipes would seek its own level by receding from the upper bearing and flowing up into, and flooding, the lower bearings. That is to say, the oil supplied to the bearing D would be lowered in the pipe 5 and forced up in the pipe 6. To prevent such leakage of oil check valves 13 are arranged in the branch pipes leading directly to all the bearings, except the lowest one, where a check valve will not be necessary.

When the supply of water to the tank B is shut off, there is apt to be more or less back pressure left in the system owing to the contraction of the previously expanded tank and pipes and the expansion of the air or other gases which have been under compression therein. To relieve the system of this back pressure and prevent it from forcing the oil up into the bearings, the valve 9 is constructed as a three way valve, so as to leave a back vent 14 in the valve for the escape of water forced back in the supply pipe.

The operation of the system will be clearly understood from the drawings and the foregoing description. When the lever or other mechanism 12 is actuated to throw the prime mover or source of power into operative relation with the machinery, the valve 9, which is operatively connected with said mechanism, will be simultaneously and automatically opened to apply the pressure of the water supply to the oil C in the tank B. This pressure will cause a flow of oil through the pipes leading from the tank to the various bearings to be oiled, and the oil will continue to flow to the bearings under a substantially uniform pressure as long as the valve 9 remains open, that is, under the connections here shown, as long as the machinery is run; and the moment the machinery is stopped by disconnection of the prime mover the flow of oil will automatically cease, all back pressure being relieved by the back-flow of water through the vent in the valve 9, instead of by a further forcing of oil into the bearings, so that there will be no waste of oil. And where the bearings are at different levels the system of check valves 13 in the branch pipes leading to the upper bearings will prevent the back flow of oil from the upper into the lower bearings.

By the term "oil" as used in the claims I mean any liquid lubricant.

I claim as my invention:

1. In a lubricating system for machinery the combination, with machine bearings to be lubricated, of a central source of oil supply having flowage connection with said bearings, means for applying fluid pressure directly on said oil supply, and means controlling said fluid pressure to cut the latter off simultaneously with the stoppage of the machinery.

2. In a lubricating system for machinery, the combination with machine bearings to be lubricated, of a common source of oil supply having flowage connection with said bearings, means for applying fluid pressure directly on said oil supply, means between the bearings and said oil supply for controlling the flow of oil from the oil supply to said bearings, and means for controlling said fluid pressure to cut the latter off simultaneously with the stoppage of the machinery.

3. In a lubricating system for machinery, the combination with machine bearings to be lubricated, of a central oil supply, means for distributing the oil from said supply to the several bearings, means interposed between said supply and the bearings for controlling the flow of oil thereto, means for applying fluid pressure behind said oil supply to lift the latter to said bearings, and means to cut off said fluid pressure.

4. In a lubricating system for machinery, the combination with machine bearings to be lubricated, of a common source of oil supply having flowage connection with said bearings, a central source of fluid pressure controlling the flow of oil, and means for relieving the system of back pressure directly the fluid pressure is taken off.

5. In a lubricating system for machinery, the combination with machine bearings arranged at different levels, of a common source of oil supply having flowage connection with said bearings, means for exerting fluid pressure upon said oil, whereby to cause it to flow to all said bearings, means for removing said pressure whereby to stop the flow of oil, and means for preventing the back-flow of oil from the higher bearings to the lower bearings when the pressure has been removed.

6. In a lubricating system for machinery the combination, with machine bearings to be be lubricated, of a central source of oil supply having flowage connection with said bearings, means for applying fluid pressure directly on said oil supply, mechanism for stopping said machinery, and means operatively connected with said stopping mechanism for cutting off said fluid pressure simultaneously with the stoppage of the machinery.

7. In a lubricating system for machinery, the combination with machine bearings to be lubricated, of a central source of oil supply having flowage connection with said bearings, mechanism for stopping and starting said machinery, and means operatively connected with said mechanism for applying fluid pressure directly on said oil supply to lift the oil to said bearings simultaneously with the starting of the machinery and for cutting off said pressure simultaneously with the stoppage of the machinery.

8. In a lubricating system for machinery, the combination with machine bearings to be lubricated, of a central source of oil supply having flowage connection with said bearings, a central source of fluid pressure, a conduit leading from said source of fluid pressure to said source of oil supply to allow the transmission of said fluid pressure to said oil supply whereby to cause the flowage of said oil, and a valved port in said conduit opened by the cutting off of said fluid pressure to relieve the system from back pressure directly the fluid pressure is taken off.

In testimony whereof I affix my signature in presence of two witnesses.

FRITZ KOCH.

Witnesses:
ARTHUR P. LOTHROP,
H. SWANSON.